Dec. 8, 1936. F. R. BELLUCHE Re. 20,194
METHOD OF AND APPARATUS FOR FEEDING SHEETS
Original Filed April 30, 1934 7 Sheets-Sheet 1
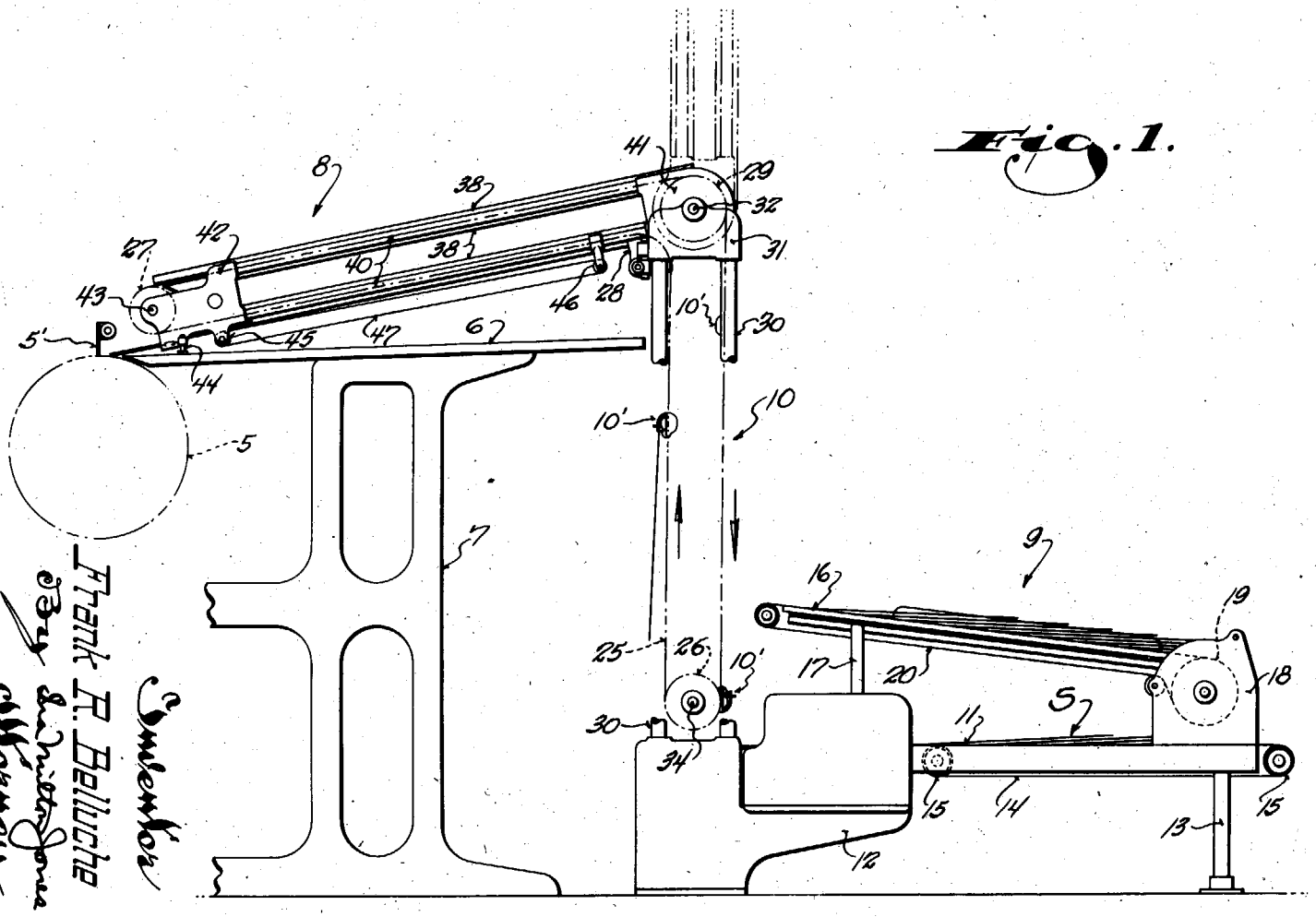
Inventor
Frank R. Belluche
By Hamilton Jones
Attorney Dec. 8, 1936. F. R. BELLUCHE Re. 20,194
METHOD OF AND APPARATUS FOR FEEDING SHEETS
Original Filed April 30, 1934 7 Sheets-Sheet 2
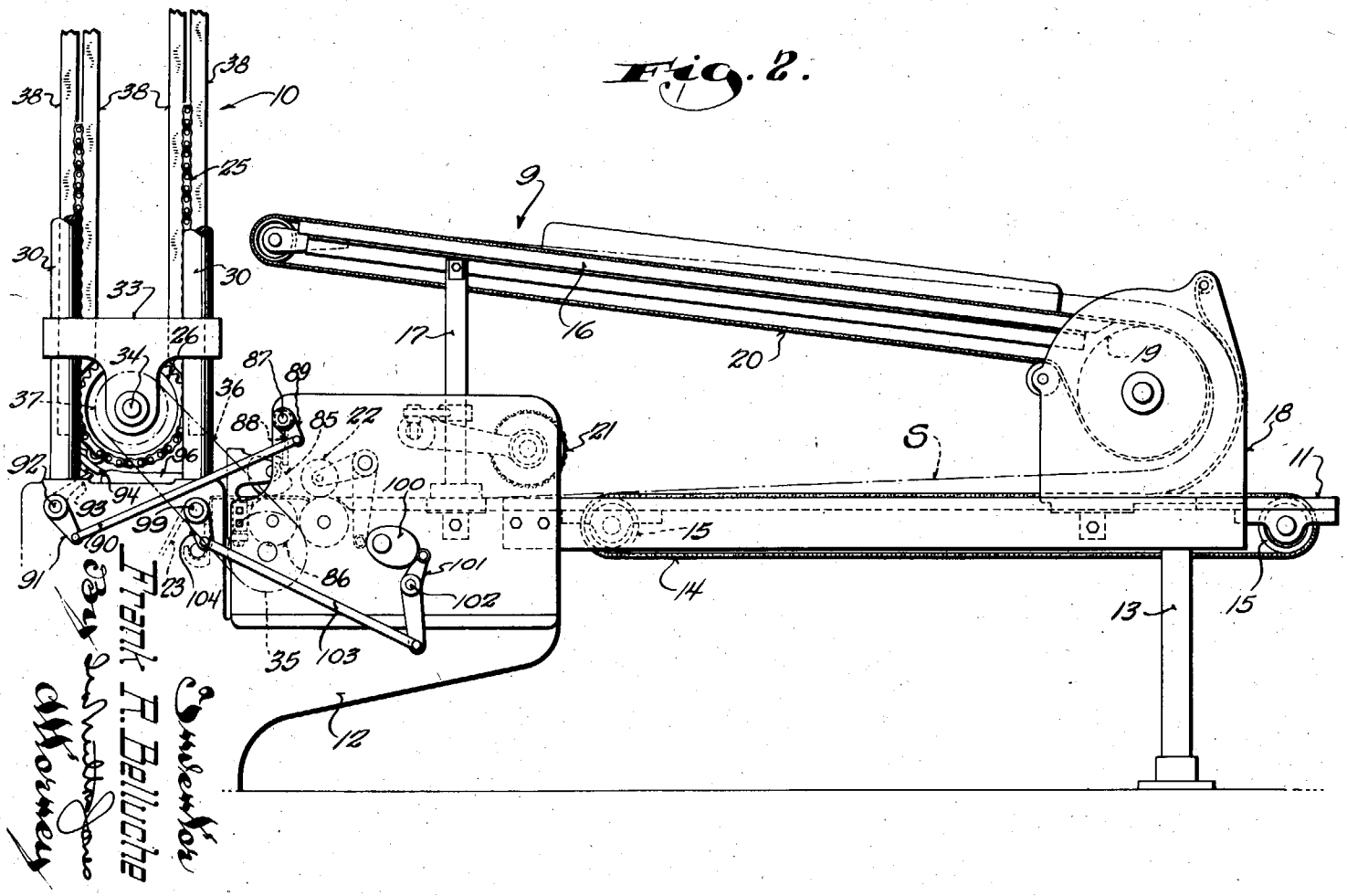

Dec. 8, 1936. F. R. BELLUCHE Re. 20,194

METHOD OF AND APPARATUS FOR FEEDING SHEETS

Original Filed April 30, 1934 7 Sheets-Sheet 3

Inventor
Frank R. Belluche
By Lewis Jones
Attorney

Dec. 8, 1936. F. R. BELLUCHE Re. 20,194

METHOD OF AND APPARATUS FOR FEEDING SHEETS

Original Filed April 30, 1934 7 Sheets-Sheet 4

Inventor
Frank R. Belluche
By Lud Wilter Jones
Attorney

Dec. 8, 1936. F. R. BELLUCHE Re. 20,194
METHOD OF AND APPARATUS FOR FEEDING SHEETS
Original Filed April 30, 1934 7 Sheets-Sheet 5
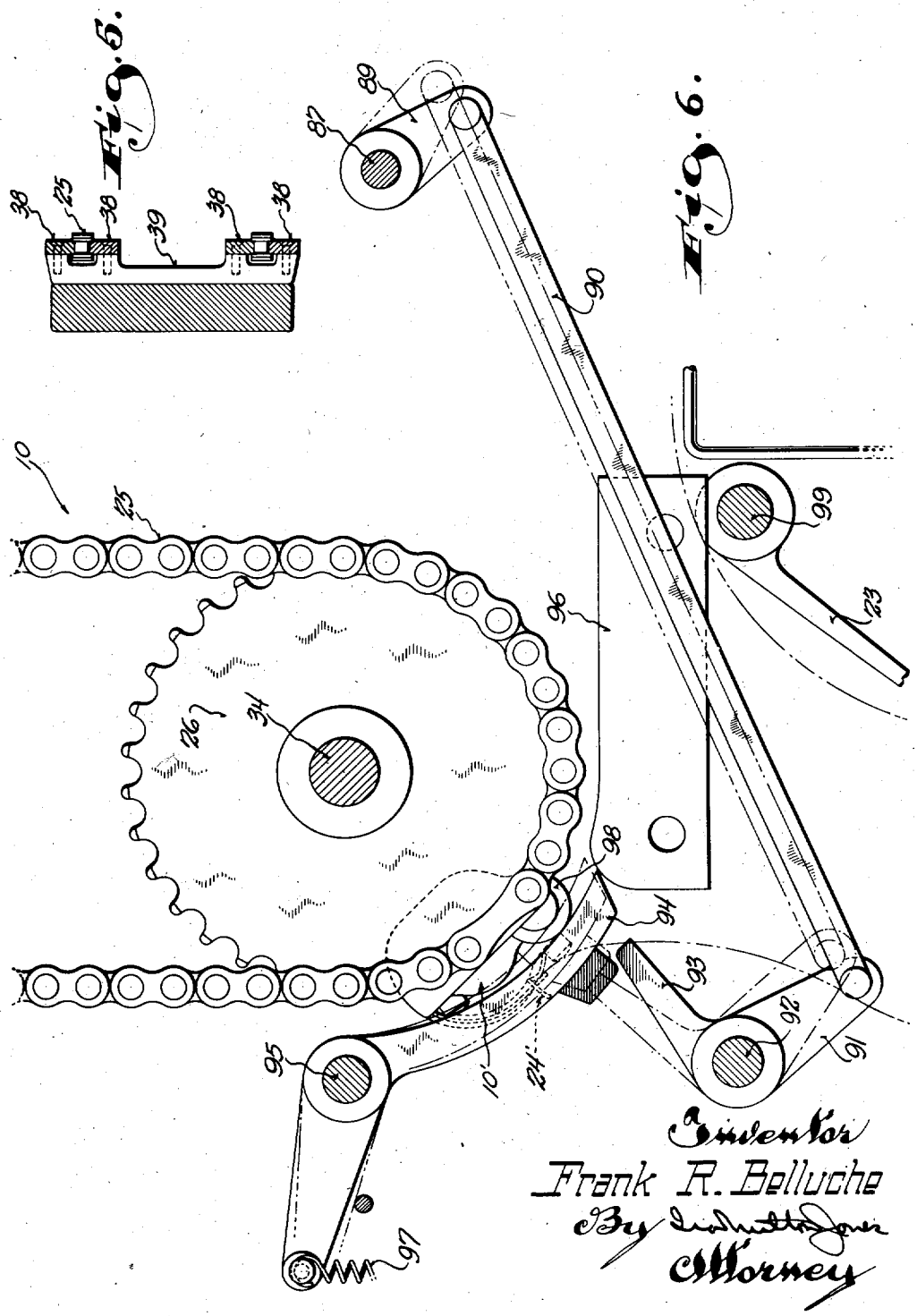

Dec. 8, 1936. F. R. BELLUCHE Re. 20,194
METHOD OF AND APPARATUS FOR FEEDING SHEETS
Original Filed April 30, 1934 7 Sheets-Sheet 6
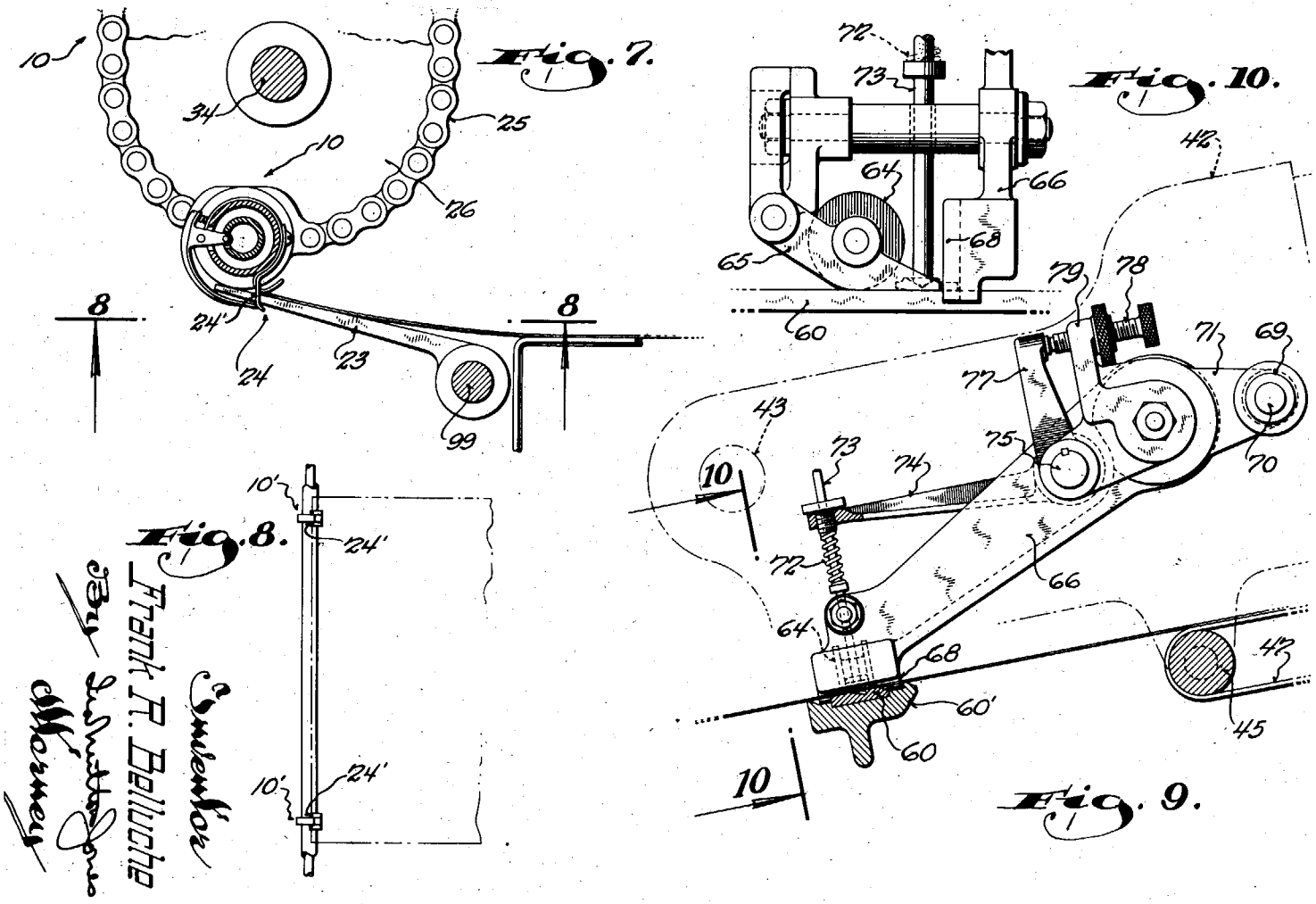

Dec. 8, 1936. F. R. BELLUCHE Re. 20,194

METHOD OF AND APPARATUS FOR FEEDING SHEETS

Original Filed April 30, 1934 7 Sheets-Sheet 7

Inventor
Frank R. Belluche
By Dwight Pitton Jones
Attorney

Reissued Dec. 8, 1936 Re. 20,194

UNITED STATES PATENT OFFICE 20,194

METHOD OF AND APPARATUS FOR FEEDING SHEETS

Frank R. Belluche, Racine, Wis., assignor to Christensen Machine Company, Racine, Wis., a corporation of Wisconsin Original No. 2,016,479, dated October 8, 1935, Serial No. 723,092, April 30, 1934. Application for reissue November 5, 1936, Serial No. 109,201

43 Claims. (Cl. 271—37)

This invention relates to sheet feeding devices for printing machines and the like, and refers more particularly to sheet feeders of the type intended for automatic feeding of large presses and kindred printing machines.

Printing presses and similar machines with which such sheet feeders are employed, are generally so constructed that the point of entrance of the sheet into the machine is at a substantial elevation above the floor. This necessitates the disposition of the feeder at a correspondingly high elevation.

Heretofore, it has been customary to mount the entire feeder unit above and often partially support the same on the feed board with which machines of this type are usually equipped. Where the feeder is of the continuous type in which successive sheets are separated from a bank to be automatically presented singly to the machine, this high location of the feeder made the loading thereof exceptionally difficult.

To load these feeders, it was necessary for the operator to carry the sheets in stacks up a flight of steps to the loading board of the feeder. Not only was this a very tiring and hazardous task, but because the operator had to work under difficult conditions on overhead platforms, the sheets were often improperly stacked which resulted in delays in operation and waste of material.

With these objections to the existing types of sheet feeding devices in mind, this invention has as an object, the provision of a sheet feeding means for printing presses and the like, which is so constructed that it can be loaded from the floor to thereby obviate carrying the sheets to an inconvenient elevation, and generally facilitate loading.

To this end, the invention consists generally of mechanism to deliver or present the sheets individually to the machine at an elevation determined by the point of entrance of the sheets into the machine, together with a feeder mechanism arranged to separate the sheets, and a conveyor to carry the sheets so separated to the elevated sheet delivering or presenting means, the feeder upon which the sheets are initially placed, being supported close to the floor so that it may be loaded by an operator standing on the floor.

Another object of this invention is to provide a sheet feeding means which, by its inherent construction, obviates the necessity for sheet slow down mechanism. This object of the invention is attained by dropping the sheets carried by gripper bars, which form part of a fast moving conveyor, down on to slow moving tapes arranged to present the sheet to the machine at a rate of speed slow enough to avoid its "bouncing" away from the front guides of the machine.

Another object of this invention is to provide a sheet feeding means of the character described, so constructed as to obviate special sheet straightening mechanism. This function is performed by stops on the sheet grippers of the conveyor against which the sheets are brought to bear, so that the sheets are carried to the machine with their forward edges in proper parallel relationship to the front guides of the machine.

Another object of this invention is to provide simple means for adjusting the tension on the rollers of the side register, from the outside of the machine.

Where pre-printed sheets were to be fed into a press or other machine for additional printing or other treatment of the printed side of the sheet, and the feeder used was of the continuous type, it was necessary in the past to turn the sheets over before loading them on the feeder. This turning of the sheets was necessary because of the fact that a continuous feeder turns the sheets over and discharges them with the reverse side up, so that unless the sheets were turned before being loaded onto the feeder, they would go to the press printed side down.

Attempts have been made in the past to obviate the necessity for turning the sheets over and loading them upside down as by using two superimposed continuous feeders, see British Patent No. 294,801, of 1928. But all past expedients proposed were found objectionable for one reason, or another, and printing establishments continued to turn the sheets manually before loading them.

It is, therefore, an object of this invention to provide improved and practical means for turning the sheets after they have been separated from the stack or other source of supply and during the transfer from the source to the press.

Another object of this invention is to provide a new and improved manner of overlapped and underlapped feeding, characterized by the fact that the sheets are removed from the source singly and in spaced succession to allow for calipering the sheets throughout their entire lengths and to permit feeding the sheets off the stack by mechanism acting on the front edge thereof, and subsequently overlapping or underlapping the same so that the sheets travel to the press in a continuous stream.

With the above and other objects in view which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated two complete examples of the physical embodiments of my invention constructed according to the best modes I have so far devised for the practical application of the principles thereof, and in which:

Figure 1 is a side view illustrating diagrammatically a sheet feeding device constructed in accordance with this invention;

Figure 2 is an enlarged side view showing the lower half of the device;

Figure 5 is a detail section view taken through Figure 3 on the plane of the line 5—5;

Figure 6 is an enlarged diagrammatic view showing the mechanism for preventing closing of the gripper in the event the trip mechanism is actuated;

Figure 7 is a section view through the discharge end of the feeder and the conveyer to show the manner in which the sheet is squared and straightened by the gripper carried stops;

Figure 8 is a bottom view showing a portion of a gripper bar to illustrate the manner in which the sheet is straightened;

Figure 9 is an enlarged detail view of the feed side of the delivery end of the sheet presenting mechanism;

Figure 10 is a detail view taken on the plane of the line 10—10 in Figure 9.

Figure 2A:
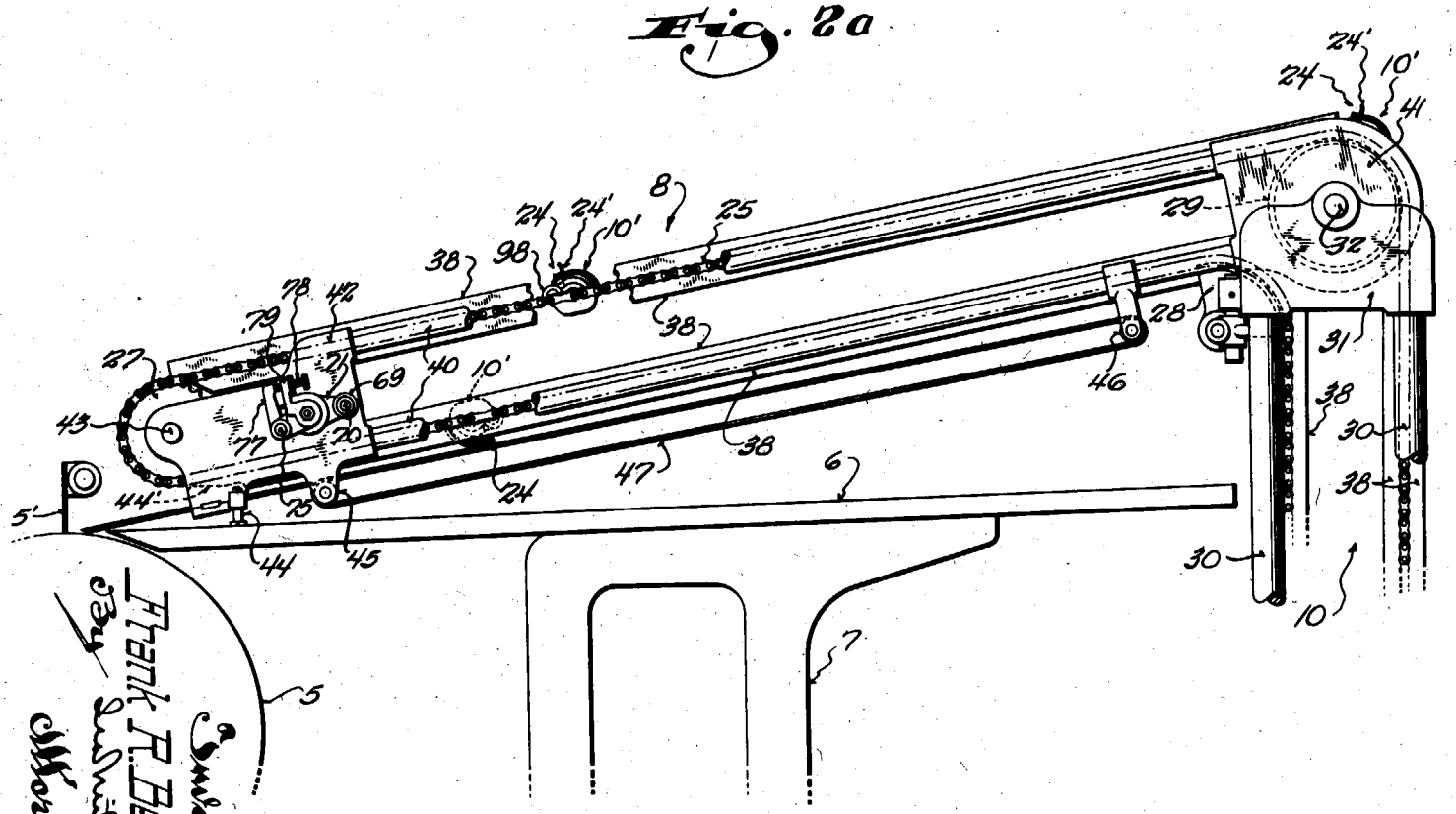
Figure 2a is a similar side view showing the upper portion or remainder of the device.
Figure 4:
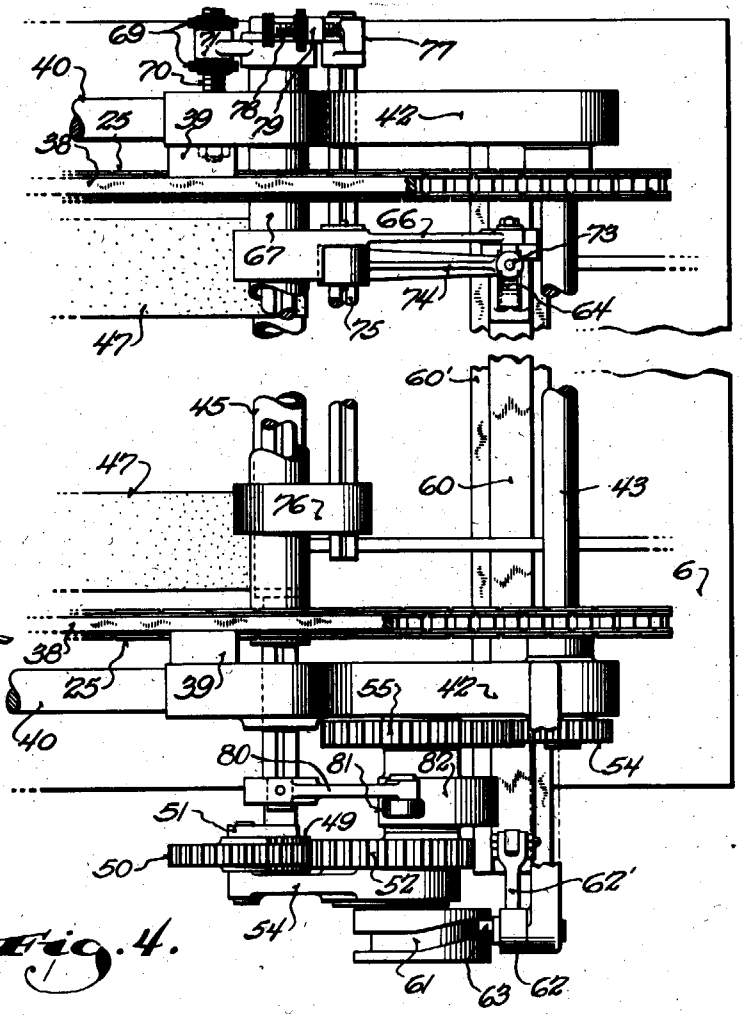
Figure 4 is a top plan view with the central portion omitted, of the delivery end of the device.
Figure 3:
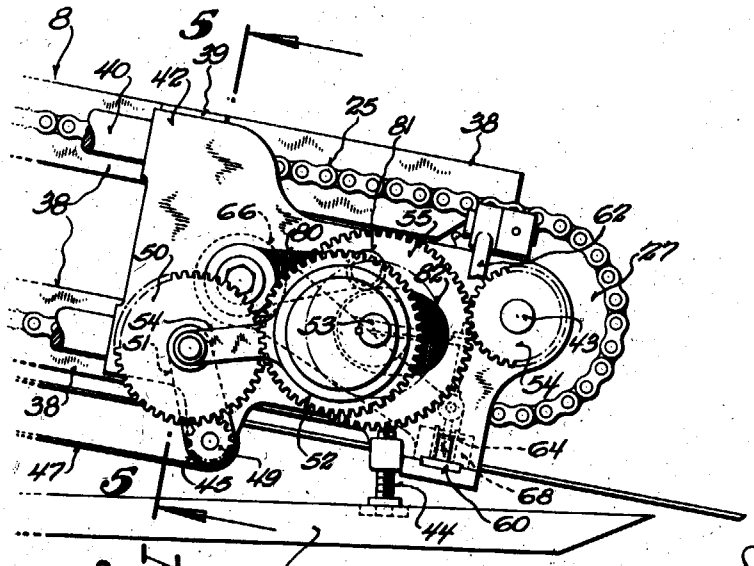
Figure 3 is an enlarged detail view illustrating the gear side of the discharge or delivery end of the device.

Referring now more particularly to the accompanying drawings in which like numerals indicate like parts throughout the several views, the numeral 5 indicates the receiving cylinder of the machine to which the sheets are to be fed. In front of the cylinder 5, there is a feed board 6, supported from the floor by a pedestal 7. In a printing machine of considerable size, the feed board 6 is necessarily mounted at a substantial elevation above the floor.

The feeding device consists generally of a delivery unit or sheet presenting unit 8, which in the present instance, is shown above and partially supported by the feed board 6; a feeder unit 9 supported close to the floor; and a conveyer 10 to elevate the sheets from the feeder unit to the delivery unit.

The feeder or receiving unit 9 is substantially a conventional continuous sheet feeder, comprising, a lower board 11, supported close to the floor at one end by side frames 12, and at its other end by short upright columns 13. This lower board 11 is equipped with a plurality of endless bank advancing tapes 14, trained over pulleys 15 and intermittently advanced to carry the bank of sheets "S" (indicated in construction lines in Figure 2) forward toward the conveyer 10.

Supported above the board 11 is an upper inclined board 16. The support for this upper board comprises upright columns 17 and end frames 18. The end frames 18 rotatably mount a drum 19 over which endless tapes 20 are trained. The tapes 20 have their upper stretches overlying the board 16 to carry the stack of sheets loaded thereon, toward and over the drum 19 to the tapes 14 on the lower board.

Adjacent the forward pulleys 15, there are combing wheels 21, which serve to separate the sheets from the pile or stack as it is advanced by the tapes 14 and to project the sheets so separated to a set of rollers 22, which in turn, further advance the sheet onto a bridging table 23. The table 23 is so disposed as to guide the sheets into the open grippers 24 carried by cross bars 10', which form part of the conveyer 10.

As best shown in Figures 7 and 8, the grippers have stops 24' against which the forward edges of the sheets engage so that as the sheets are brought to the grippers, they are automatically straightened with respect to the bars, and as the bars are parallel with the front guides 5' of the machine, further straightening of the sheets is unnecessary.

The conveyer 10 comprises the gripper bars 10' and a set of endless sprocket chains 25. The chains are trained about a set of drive sprockets 26 adjacent the feeder unit 9 and idler sprockets 27 located at the extreme outer end of the delivery unit 8. Their inner stretches are trained over guides 28 and their outer stretches are trained over idler pulleys 29 by which the direction of the run of the conveyer is changed from vertical to substantially horizontal.

To support the sprockets 26, the guides 28 and the idler wheels 29, supporting posts 30, project vertically from the side frames 12. The upper ends of the posts 30 are connected by cap members 31, which afford bearings for the shaft 32, upon which the idler wheels 29 are mounted, and which also afford a support from which the guides 28 are adjustably mounted for tightening the chains.

Adjacent their lower ends, the posts 30 have brackets 33 fixed thereto, which provide bearings for the shaft 34, upon which the drive sprockets 26 are mounted.

The drive for the conveyer may be provided in any desired manner, and in the present instance, it is diagrammatically illustrated as comprising a sprocket 35 driven from the mechanism of the feeder and drivingly connected through a chain 36 with a sprocket 37 fixed to the shaft 34.

Both the vertical and horizontal runs of the chains are preferably guided by guide tracks 38 supported in any suitable manner and spaced apart a distance just sufficient to accommodate the chains. A convenient manner of supporting the guide tracks 38 is illustrated in Figure 5. As here shown, the tracks are secured to brackets 39, which in turn are carried by any fixed portion of the structure.

The delivery unit 8 comprises a pair of parallel tie rods 40, on each side of the unit, the rear ends of which are fixed to heads 41 which are journalled on the shaft 32. The forward ends of the tie rods 40 have frames 42 secured thereto which carry bearings for the shaft 43 on which the sprockets 27 are mounted. Adjustable legs 44 extend down from the frames 42 to support the delivery unit from the feed board.

Supported from the lower tie rods 40 and the frames 42 are tape rolls 45 and 46 respectively, over which a plurality of tapes 47 are trained.

Onto these tapes 47 the sheets carried upwardly and forwardly by the conveyer are deposited to be presented to the machine. The drive for the tapes 47 is of varying speed, but as a whole, the speed of the tapes is considerably slower than that of the chains of the conveyer, so that the sheets are carried quickly from the feeder unit to the delivery unit and presented slowly to the front guides 5' of the machine. The variation in the speed of the tapes is such that they travel slowest at the moment the sheet arrives at the front guides.

The front tape roll 45 has a pinion 49 fixed to its shaft which meshes with an idler gear 50. The gear 50 is maintained in mesh with the pinion 49 by a link 51. Meshing with the gear 50 is an eccentrically mounted drive gear 52 eccentrically fixed to a cam shaft 53. A link 54 maintains the idler gear 50 in mesh with the gear 52.

The cam shaft 53, which mounts the eccentric gear is a stub shaft suitably journalled in the adjacent side frame 42 and is driven from the sprocket shaft 43 through a pinion 54 fixed to the sprocket shaft and meshing with a gear 55 fixed to the cam shaft.

As stated, the tapes 47 travel at a slower speed than the conveyer, and as the trailing edges of the sheets drag on the tapes, the sheets will be straightened to drop down flat onto the tapes when the grippers 24 are opened in the customary manner by a cam 44' carried by one of the side frames 42.

As the sheets advanced by the tapes come to rest against the front guides 5', a side registering means functions to pull the sheet sidewise against a side guide 68 to be later described. This side registering means may be of any conventional construction, but to allow the gripper bars to pass must be intermittently lifted. In the present instance, the side registering means includes a flat bar 60, slidably mounted in a cross rail 60' and reciprocated by a barrel cam 61. The motion produced by the cam is transmitted to the bar 60 through a lever 62 pivoted at its upper end from a fixed support carried by the adjacent side frame 42 and connected at its lower free end with the bar through a link 62'. At its medial portion, the lever has a cam follower 63 to track in the cam.

The sheet is held down onto the bar 60 by a pressure roller 64. The pressure roller 64, as best shown in Figure 10, is carried by the outer free end of a lever 65, pivotally mounted on the outer end of a supporting arm 66. The arm 66 is slidably splined on and securable to a tube 67, which in turn is slidably splined on a cross shaft mounted in the side frames 42. By reason of the fact that the tube 67 is slidable on the cross shaft, the tube with the arm 66 fixed thereto, is adjustable transversely of the unit to afford means for closely adjusting the location of the side guide 68 on the outer end of the arm 66. Coarse adjustment is effected by moving the arm 66 on the tube 67. Endwise adjustment of the tube 67 is conveniently accomplished by adjusting nuts 69 threaded on a screw fixed stud 70, on opposite sides of an arm 71 which is fixed to one end of the tube 67.

Being carried by the pivoted lever 65, the pressure roller 64 is movable toward and from the cross bar 60, independently of the arm 66 and to yieldably urge the roller toward the bar, a compression spring 72 is provided. This spring is coiled about a pusher rod 73 having its lower end bearing against the free end of the pivoted lever 65 and its upper end slidably guided in the outer free end of an arm 74, which is slidably splined to a cross shaft 75. The spring is confined between the arm 74 and a shoulder on the pusher rod 73, so that the rod and consequently the pivoted lever 65 are yieldably urged toward the bar 60.

The cross shaft 75 is carried by the arm 66 and a short arm 76 also fixed to the tube 67, so that the shaft 75 is at all times maintained in a predetermined relationship with respect to the arm 66 and moves up and down with any adjustment thereof.

There is also a connection between the lever arm 74 and the arm 66, which constrains these members against separation, so that any sidewise adjustment of the arm 66, effects a corresponding motion on the part of the arm 74. These two members thus form a unitary assembly.

One end of the shaft 75 projects through an opening in the side frame 42 on the feed side of the machine. To this end of the shaft 75, a lever 77 is secured. An adjusting screw 78 threaded in a suitably fixed support 79 is arranged to bear against the outer free end of the lever 77 to provide a micrometer adjustment of the degree of compression on the spring 72.

In this manner, the pressure on the roller 64 is conveniently adjustable, while the feeding device is in operation.

Inasmuch as the gripper bars travel past the side registering mechanism, it is necessary that this entire assembly be lifted out of the path of the bars to permit the same to pass. For this purpose, an arm 80 is fixed to the shaft upon which the tube 67 is slidably splined on the gear side of the feeding device. The outer end of this arm carries a cam follower 81 arranged to track on a cam 82 fixed to the cam shaft 53. This cam is so timed with respect to the passage of the gripper bars, as to lift the side registering mechanism upon the passage of each bar.

Calipering means are also provided to prevent double or folded sheets, or mutilated sheets from being picked up by the grippers of the conveyer. This means comprises a conventional trip mechanism consisting of a segment 85 accurately spaced from a roller 86 over which the sheets travel so that when a double sheet or a sheet having greater thickness than that to which the segment is set, passes over the roller, the segment is rocked, which motion is translated to a rock shaft 87 journalled in the side frames 12 by means of a depending lever 88 fixed to the shaft 87 with its free end in the path of an extension on the segment.

At one end of the shaft 87, there is a lever 89, which is connected through a link 90 to a lever 91 fixed to a shaft 92 also journalled in the side frames 12. The shaft 92 has a finger 93 fixed thereto, the outer end of which is arranged to engage and support a movable cam 94 pivotally mounted as at 95 (see Figure 6). The movable cam 94 forms a continuation of a fixed cam 96 provided to open the grippers at the proper instant to receive the sheets presented thereto.

Under normal conditions of operation, when the trip mechanism does not operate, the movable cam 94 merely tilts about its pivotal mounting 95 against the action of a light spring 97 provided to hold the cam to its normal position, as the cam following rollers 98 of the gripper bars advance. In other words, under such circumstances, the grippers remain closed, but in the event an improper sheet is advanced, which causes the trip mechanism to function, the finger 93 will be moved to its dotted line position illustrated in Figure 6, positively holding the movable cam 94 against depression by the cam following roller 98, and as a consequence, the grippers are prevented from closing and the sheet or sheets presented thereto will not be carried up to the delivery unit.

To facilitate the transfer of the sheets from the feeder to the conveyer, the bridging platform 23, which is in fact a series of fingers fixed to a cross shaft 99, is tilted as illustrated in Figure 6, to allow the sheet to loop down, so that its trailing edge quickly clears the advancing successive sheet.

Dropping the bridging platform 23 to permit the sheets to loop, is particularly important when the sheets are fed to the delivery unit in overlapped relationship as hereinafter more fully described, as it is necessary in that event to enable the sheet, which has been picked up by a gripper bar, to quickly clear the leading edge of the next sheet.

To tilt or drop the bridging table 23, a cam 100 is provided. This cam is continuously driven from the mechanism of the feeder in any suitable manner and rocks a bell crank lever 101 pivotally mounted as at 102. The lever 101 is connected through a link 103, to a lever 104 fixed to the shaft 99.

As will be obvious from the fact that the tapes 47 travel at a slower speed than the chain conveyer by which the sheets are deposited onto the tapes, an overlapped relationship of the sheets on the tapes is obtained. It is, of course, possible either through a slower conveyer speed or increased distance between its gripper bars, to obtain successive non-overlapped disposition of the sheets on the tapes 47, but as it is a desideratum of this invention to attain slow presentment of individual sheets to the press without sacrificing output speed, the overlapped disposition of the sheets on the tapes is preferably utilized.

It is to be observed, however, that although the sheets arrive at the press in overlapped relation, they leave the feeder in single succession to permit calipering throughout the full length of the sheet. This also permits the sheets to be engaged at their front edges in withdrawing them from the pile or stack.

Figure 11:
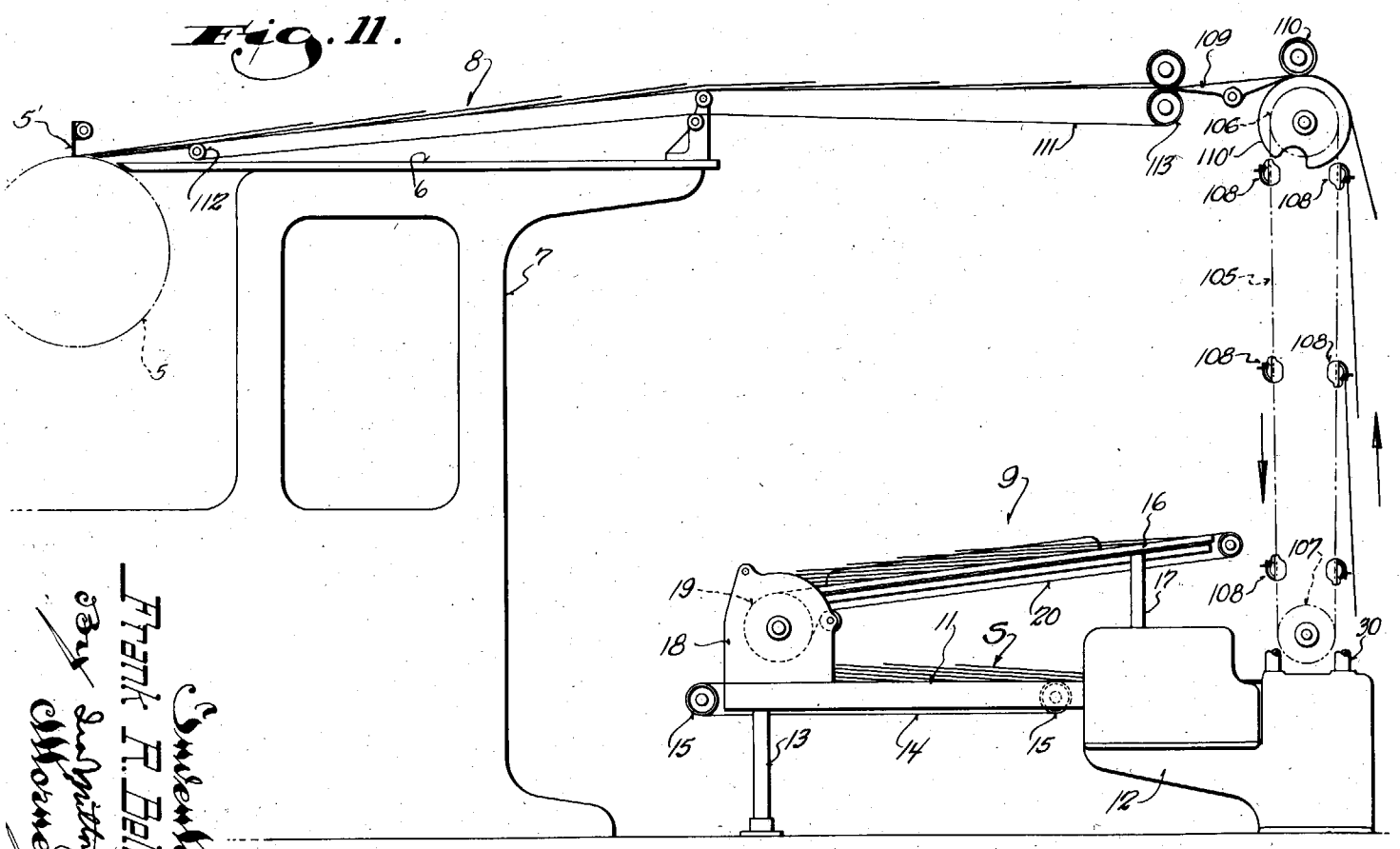
Figure 11 is a view similar to Figure 1, but illustrating a slightly modified embodiment of the invention.

In instances where preprinted sheets are to be printed or otherwise acted upon, it is necessary that the sheets be fed with their printed side up, and inasmuch as the conventional continuous feeder delivers the sheets upside down, it was necessary in the past to manually turn over the stack before loading, or in other words, load the sheets with their printed side down. This inconvenience is overcome with the modified embodiment of this invention illustrated in Figure 11.

This modification in many respects is identical to that shown in Figure 1. It embodies the same continuous feeder 9, but instead of having it discharge the sheets toward the press, it discharges them in the opposite direction. As the sheets are separated from the pile by the feeder 9, they are presented to an endless conveyer 105 comprising endless chains trained about vertically spaced upper and lower sprockets 106 and 107 respectively. The conveyer 105, as in the embodiment previously described, has a plurality of gripper bars 108 equipped with grippers which pick up the sheet from the feeder 9 and carry the same upwardly as shown.

The sheets having been loaded on the feeder 9 with their printed side up, are presented to the conveyer 105 with their printed side down.

At the upper end of the conveyer 105, suitable mechanism (not shown) is provided to open the grippers, so that the sheet may be advanced toward the press over a bridging table 109 by a roller 110, to be fed onto endless tapes 111 trained about a front roll 112 and a rear roll 113. The endless tapes 111 extend forwardly over the top of the feed board 6, and suitable mechanism (not shown) is supported adjacent the front roll 112 to receive the sheets and present them properly to the cylinder 5 of the machine being fed.

It is apparent that through this arrangement, the sheets will be deposited on the tapes 111 with their printed sides uppermost as required.

The endless tapes 111, which form the delivery unit to carry the sheets to the press, move at a relatively slow speed with reference to the press so that the sheets are brought to the press at the proper speed without entailing the use of slowdown mechanism. But regardless of the slow speed of the tapes 111, proper feeding speed to the press is maintained by depositing the sheets on the tapes in overlapped relation with the top sheet foremost. Depositing the sheets onto the delivery tapes in such overlapped relationship also permits maintaining the desired high feeding speed without entailing an excessive speed of operation of the conveyer and delivery units.

The overlapped relationship of the sheets on the delivery tapes 111 is obtained by spacing the gripper bars of the conveyer 105 a distance less than the length of the shortest sheet for which the machine is designed, so that as the sheets are carried up from the feeder to the delivery tapes, they hang in overlapped relationship as illustrated.

While carried upwardly by the conveyer 105, the distance which the sheets overlap is the difference, between the length of the sheets and the distance between the adjacent gripper bars 108. When the gripper bars reach the upper end of the conveyer and swing about the center of the sprockets 106, the sheets carried thereby travel at a slightly faster speed than the sheets being carried vertically by the conveyer 105 so that the overlap of the sheets as they swing about the center of the sprockets 106 to be disposed on the tape conveyer 111 which travels at the same speed as do the sheets in their turn about the center of the sprockets 106, is slightly less than it is during their vertical travel.

This difference in speed and the resulting difference in the overlap of the sheets results from the fact that the point at which the sheet is gripped is spaced outwardly of the pitch line of the conveyer chain so that during the turn about the center of the sprockets 106, the difference in the radius of the turn described by the pitch line and the point at which the sheet is carried results in an increased speed of the sheet.

As noted hereinbefore, the roller 110 acts to feed the sheets onto the endless tape conveyer 111 and coacting with this roller are disks 110′ of a diameter corresponding to the radius of the turn made by the point at which the sheet is gripped. These disks are cut out to accommodate the gripper bars as shown.

The overlapped relation of the sheets as they are carried from the feeder to the delivery tapes necessitates a quick transfer from the feeder to the conveyer and as pointed out hereinbefore, this is facilitated by permitting the trailing portions of the sheets to loop down after their leading edges are picked up by the gripper bars, this being made possible by the bridging table 23 dropping down as shown in Figure 6.

From the foregoing description taken in connection with the accompanying drawings, it will be readily apparent to those skilled in the art to which this invention appertains, that this invention presents a novel and practical innovation in sheet feeding devices, and while in the embodiment illustrated, a continuous feeder has been shown and described, the inventive concept is not restricted to this particular combination. Other types of feeders may be employed without deviating from the spirit of the invention, the important factor being that the loading of the feeder is facilitated by the arrangement of the units in accordance with this invention.

What I claim as my invention is:

1. Sheet feeding means for printing machines and the like, comprising a feeder unit having means to separate the sheets, a slow moving tape conveyer to present sheets individually to the machine, said tape conveyer being supported at an elevation determined by the height of the point of entrance of the sheets into the machine, and the feeder unit being supported close to the floor to facilitate loading thereof, and means to convey sheets singly from the feeder unit to the tape conveyer.

2. Sheet feeding means to separate sheets from a stack and present them individually to a machine to be fed, comprising the combination of a slow moving tape conveyer mounted at an elevation dependent upon the height at which the sheets must enter the machine and arranged to slowly present sheets to the machine, a feeder unit supported close to the floor to facilitate loading of sheets thereon, said feeder unit having means to separate sheets, and an endless conveyer to carry sheets individually from the feeder unit to the tape conveyer.

3. In means to feed sheets individually to a printing machine or the like, means to present sheets individually and directly to the machine, a continuous feeder comprising means to support a bank of sheets, bank advancing mechanism and mechanism to separate the sheets from the bank, said continuous feeder being supported close to the floor to enable the loading of the same by an attendant standing on the floor, and means to carry sheets which have been completely separated from the bank to said sheet presenting means for direct presentment to the machine thereby.

4. In sheet feeding means for printing machines and the like having an elevated feed board, mechanism supported on the feed board to present sheets singly and directly to the machine, a sheet feeder at a lower elevation than the feed board and comprising means to support sheets and mechanism to separate the sheets, and conveyer means to carry sheets from the separating means up to the mechanism on the feed board for presentment to the machine.

5. In sheet feeding means for printing machines and the like to which sheets must be fed at a substantial elevation above the floor, mechanism to present sheets singly to the machine at said elevation, feeder mechanism including a support upon which sheets to be fed are placed and means to separate sheets, and conveyer means to carry sheets from the separating means up to the sheet presenting mechanism for presentment to the machine, the feeder mechanism having its sheet supporting means close to the floor so as to facilitate the loading of sheets thereon.

6. Sheet feeding means for printing machines and the like comprising, mechanism to present sheets to the machine including slow moving tapes, and means operable on the forward edges of the sheets to deposit sheets on the tapes including a conveyer travelling in the same direction as the tapes to carry the sheets to the tapes and adapted to drop the sheets thereon, said conveyer travelling at a faster speed than the tapes so that the sheets dropped therefrom onto the tapes form an imbricated row.

7. Means to feed sheets to printing machines and the like comprising, slow moving tapes arranged to present the sheets to the machine, and fast moving conveyer means engaging the sheets at their forward edges and travelling in the same direction as the slow moving tapes to carry sheets over the tapes and drop the same thereon.

8. Means to feed sheets to printing machines and the like comprising, a slow moving conveyer movable toward the machine and upon which sheets are adapted to be deposited for presentment to the machine, and a fast moving conveyer travelling in the same direction as the slow moving conveyer and arranged to carry sheets by their forward edges from a source of supply over the slow moving conveyer and to drop the sheets onto said slow moving conveyer to form an imbricated row.

9. Sheet feeding means for printing machines and the like comprising, the combination of a slow moving conveyer arranged to present sheets dropped thereon to the machine, and a fast moving conveyer comprising endless chains carrying gripper bars arranged to carry sheets from a source of supply over the slow moving conveyer and to drop the sheets on said slow moving conveyer.

10. Sheet feeding means for printing machines and the like comprising, the combination of slow moving tapes to present sheets dropped thereon to the machine, and a fast moving conveyer having endless chains connected by gripper bars to carry sheets from a source of supply over the slow moving tapes and to drop the sheets on said slow moving tapes for presentment to the machine, said conveyer travelling faster than the tapes.

11. Sheet feeding means for printing machines and the like comprising the combination of overhead means to present sheets slowly to the machine, means located near the floor to support a plurality of sheets, means to separate the sheets from the plurality on said supporting means, and a fast moving conveyer arranged to carry sheets so separated up to the sheet presenting means and to deposit such sheets singly upon the sheet presenting means.

12. Sheet feeding means for printing machines and the like comprising, the combination of a slow moving overhead conveyer to present sheets slowly to the machine, feeder mechanism located near the floor to receive a plurality of sheets and separate them, and a fast moving conveyer to carry sheets separated from the plurality up to the slow moving conveyer and to deposit such sheets on said slow moving conveyer for presentment to the machine.

13. Sheet feeding means for printing machines and the like comprising, the combination of slow moving tapes to present sheets slowly to the machine, means to support said slow moving tapes at an elevation determined by the point of entrance of the sheets to the machine, feeder mechanism supported close to the floor so as to facilitate its being loaded with sheets to be fed, said feeder mechanism having means to separate sheets, and a fast moving conveyer to carry sheets so separated up to the slow moving tapes and deposit such sheets on said slow moving tapes for presentment to the machine.

14. Sheet feeding means for printing machines and the like comprising, the combination of endless tapes arranged to present sheets deposited thereon to the machine at an elevation determined by the point of entrance of the sheets into the machine, feeder mechanism supported close to the floor so as to facilitate the disposition of sheets to be fed thereon, said feeder mechanism including means to separate the sheets, and conveyer means to elevate the sheets so separated up to the endless tapes and to deposit the sheets thereon for presentment to the machine.

15. In a sheet feeding mechanism of the character described, slow moving tapes arranged to slowly present sheets deposited thereon to a machine being fed, and means to deposit sheets on said slow moving tapes comprising, a conveyer moving rapidly over the tapes and in the same direction of movement as the upper stretches of the tapes, and sheet gripping means carried by said conveyer, the sheet upon release from said gripping means dropping directly on the tapes.

16. In a sheet feeder for printing machines and the like, slow moving tapes arranged to present sheets deposited thereon slowly to the machine, and means to deposit sheets onto said tapes comprising, an endless conveyer travelling rapidly across the top of the tapes and in the same direction of movement as the upper stretches of the tapes, sheet gripping means carried by said endless conveyer, and means to open the sheet gripping means so that the sheet is dropped onto the slow moving tapes.

17. In a sheet feeding means for printing machines and the like, slow moving tapes arranged to present sheets deposited thereon slowly to the machine, an endless conveyer having one of its runs travelling over the top of the tapes in the same direction as the upper stretches of the tapes, but at a faster rate of speed, sheet gripping means carried by said conveyer to grip the leading edge of the sheets and carry the sheets over the tapes with their trailing edges dragging on the tapes, and means to release the sheets from the gripping means after the sheet has been carried over the tapes to a predetermined position from which its further advance to the machine is effected entirely by the slow moving tapes.

18. In a sheet feeding device for printing machines and the like to which sheets must be fed at a substantial elevation above the floor, a conveyer to carry sheets singly from a source of supply to the machine, said conveyer having a substantially vertical stretch to elevate the sheets from the source of supply to a substantially horizontal stretch which carries the sheets flatwise to the machine.

19. In a sheet feeding device for printing machines and the like, means to present sheets to the machine, said means being supported at a substantial elevation above the floor as determined by the point of entrance of the sheets into the machine and forming a substantially horizontal support upon which the sheets are deposited flatwise, and a conveyer to carry sheets individually from a source of supply to said sheet presenting means, said conveyer having angularly disposed runs, one of which is substantially upright to carry the sheets to the elevation of the sheet presenting means and the other of which is substantially horizontal to overlie the sheet presenting means for depositing the sheets flatwise thereon.

20. Sheet feeding means for printing machines and the like, comprising endless tapes having their upper stretches substantially horizontal for presenting sheets flatwise to the machine, and an endless chain conveyer to carry sheets from a source of supply to said tapes, said endless chain conveyer having a substantially upright run to elevate the sheets from the source of supply to the height of the tapes and a substantially horizontal run overlying the tapes to carry the sheets thereover.

21. In a sheet feeding device for printing machines and the like, a conveyer to carry sheets from a source of supply near the floor to an elevated position for flatwise presentment to the machine, said conveyer having a fixed section disposed substantially upright to carry the sheets to the required elevation and a movable section adapted to be swung from a substantially horizontal position at which it presents the sheets flatwise to the machine, to an upright position clear of the machine.

22. In combination with a printing machine having a feed board over which sheets may be fed to the machine, an automatic sheet feeding device to feed sheets to the machine, said automatic feeding device including a conveyer having a substantially upright section to carry sheets from a source of supply to an elevation above the feed board and a movable section to carry sheets across the top of the feed board toward the machine, said movable section being movable from a position overlying the top of the feed board to a position raised off the feed board.

23. In a sheet feeding device, means to present sheets singly to a machine to be fed including a supporting structure having side frames connected by cross members, side registering mechanism to properly side-guide the sheets as they are presented to the machine, said side registering mechanism including a transversely moving support upon which the sheets rest during the side registering operation, a pressure member to hold the sheet down on said transversely moving support, and means to adjust the degree of pressure with which said pressure member holds the sheet onto the transversely moving support from the outside of one of said side frames.

24. In a sheet feeding device for printing machines and the like, a sheet delivery unit arranged to present sheets singly to the machine, said unit having a supporting structure including side frames connected by cross members, side registering mechanism to properly side-guide the sheets as they are presented to the machine, said side registering mechanism including a transversely reciprocating support over which the sheets pass, and a pressure member to hold the sheets down on said support, means to apply an adjustable pressure on said pressure member, and means accessible from the outside of one of the side frames for adjusting said pressure.

25. In a sheet feeding device for printing machines and the like, a sheet delivery unit arranged to present sheets singly to the machine, said unit having a supporting structure including side frames connected by cross members, side registering mechanism to properly side-guide the sheets as they are presented to the machine, said side registering mechanism including a transversely reciprocating support over which the sheets pass, and a pressure member to hold the sheets down on said support, means to apply an adjustable pressure on said pressure member, said last named means comprising a compression spring arranged to press down on said pressure member, a shaft extending transversely across the unit with one end projecting through one side frame, an arm fixed to said shaft with its outer end forming a support for the spring, and means acting on the outer end of said shaft outside the said side frame for imparting rotation to the shaft to move the lever arm toward and from the pressure member and thereby adjust the compression on the spring.

26. In a sheet feeding device for printing machines and the like, a delivery unit to present sheets to the machine including a supporting structure having a side frame, side registering mechanism including a pressure applying member, and means to adjust the effective pressure of said pressure applying member from outside the side frame, comprising a rock shaft having one end projecting through the side frame, a lever arm carried by the rock shaft and movable toward and from the pressure applying member, a compression spring engaging said lever arm and applying its force of compression on the pressure applying member, and means on the outside of the side frame to turn said rock shaft to move the lever arm toward or from the pressure applying member and thereby adjust the compression of said spring.

27. In a sheet feeding device for printing machines and the like, a delivery unit to present sheets singly to the machine including a conveyer having gripper bars arranged to carry the sheets toward the machine, side registering mechanism to properly side register the sheets as they are presented to the machine, said side registering mechanism including means to engage down onto the top of the sheets, and means to intermittently raise said last mentioned means to clear the gripper bars as they pass.

28. In a sheet feeding device for printing machines and the like, a delivery unit to present sheets singly to the machine, said delivery unit including an endless conveyer having gripper bars arranged to carry the sheets toward the machine, side registering mechanism to properly side-guide the sheets as they are presented to the machine including a transversely moving supporting member over which the sheets pass, means above said supporting member to hold the sheets down on the supporting member during the side registering operation, and means to positively intermittently lift the pressure applying means to enable the gripper bars to pass.

29. In combination with a printing machine and a continuous feeder having means for separating sheets from a fanned out stack for presentment to the machine, conveyer means arranged to receive sheets from the separating means and carry them to the machine, and said feeder and conveyer means being so disposed with respect to the machine as to turn the sheets over after they have been separated and during their passage from the feeder to the machine to insure their being presented to the machine with the same side up as when loaded on the continuous feeder.

30. In combination with a printing machine and a continuous feeder having means to separate sheets from a fanned out stack for presentment to the machine, said continuous feeder turning the sheets over during the operation thereof so that sheets loaded on the feeder with the printed side up leave the feeder after being separated from the stack with their printed side down, and conveying means to carry separated sheets from the feeder to the machine, said conveying means being arranged to turn the sheets over after separation and during their passage from the feeder to the machine so that the sheets are presented to the machine with their printed side up.

31. Sheet feeding means for printing machines and the like comprising, tapes arranged to present sheets flatwise to the machine, a feeder of the continuous type wherein sheets loaded thereon with their printed sides up are turned over so that they leave the feeder with their printed sides down, and an endless chain conveyer arranged to carry sheets from the feeder to the tapes and to present the sheets to the tapes with their printed sides up.

32. In a sheet feeding device for printing machines and the like, an endless tape conveyer to present sheets to the machine, said tape conveyer being movable to carry the sheets toward the machine, a sheet feeder of the continuous type mounted beneath the endless tape conveyer, and arranged to discharge the sheets therefrom in a direction away from the machine, and conveyer means to elevate sheets from the continuous feeder to the endless tape conveyer, said conveyer being so associated with the feeder and the endless tape conveyer, that the sheets are deposited on the endless tape conveyer with the same side up as when loaded on the feeder.

33. In a sheet feeding mechanism for presenting sheets to printing machines and the like, slow moving tapes to present the sheets to the machine, and a conveyer to carry sheets from a source of supply to the tapes, said conveyer comprising, gripper bars to grip and carry individual sheets, and said gripper bars being spaced apart a distance less than the length of the sheets so that the sheets are carried to the tapes and deposited thereon in overlapped relationship.

34. In a sheet feeding device of the character described, feeder mechanism to separate sheets for individual conveyance to a machine being fed, a conveyer to receive and carry sheets so separated, said conveyer having gripper bars successively presented to the feeder to grip sheets separated thereby, and said gripper bars being spaced apart a distance less than the length of the sheets so that the sheets assume an overlapped relationship during their conveyance by the conveyer.

35. In a sheet feeding device of the character described, feeder mechanism to separate sheets for individual conveyance to a machine being fed, a conveyer to receive and carry sheets so separated, said conveyer having gripper bars successively presented to the feeder to grip sheets separated thereby, and said gripper bars being spaced apart a distance less than the length of the sheets so that the sheets assume an overlapped relationship during their conveyance by the conveyer, a bridging table to guide sheets from the feeder to the gripper bars during transfer from the feeder to the gripper bars, and means to move the bridging table to an inoperative position directly after the sheets are picked up by the gripper bars to permit the trailing portions of the sheets picked up to loop down out of the way of the leading edges of successive sheets.

36. In a sheet feeding device, a feeder mechanism to separate sheets from a plurality, a conveyer to carry sheets so separated away from the feeder, said conveyer having sheet gripping means presented to the feeder at definite time intervals to successively grip the sheets separated by the feeder, and a swinging sheet supporting and guiding member between the feeder and the conveyer to support and guide sheets during transfer from the feeder to the conveyer and to swing down out of the way of the trailing portions of sheets directly after they are picked up by the conveyer to allow such trailing portions to clear the leading edges of successive sheets.

37. A method of feeding sheets from a stack to a printing machine or the like, which comprises removing the sheets successively and completely from the stack, overlapping the sheets after their removal from the stack, and feeding the sheets during their final distance of travel to the machine in overlapped relationship.

38. A method of feeding sheets from a stack to a printing machine or the like, which comprises removing the sheets individually and successively from the top of the stack, feeding the sheets directly upon being removed from the stack along a defined path for an initial part of the distance from the stack to the machine at high speed and in non-overlapped succession, overlapping the sheets, and feeding the sheets for the remainder of the distance from the stack to the machine and along said defined path in overlapped relationship and at slow speed.

39. A method of feeding sheets from a stack to a printing machine or the like, which comprises removing the sheets successively from the stack, feeding the sheets along a defined path at a predetermined speed and in non-overlapped succession for part of the distance from said stack to the machine, calipering the sheets as they travel at said predetermined speed, overlapping the sheets after they have been calipered, and feeding the sheets during their final distance of travel along said path to the machine in overlapped relationship and at a speed slower than said predetermined speed.

40. A method of feeding sheets from a stack to a printing machine or the like, which comprises removing the sheets individually and successively from the top of the stack, feeding the sheets directly upon being removed from the stack along a defined path for an initial part of the distance from the stack to the machine at high speed and in non-overlapped succession, calipering the sheets as they travel at high speed, overlapping the sheets after they have been calipered, and feeding the sheets for the remainder of the distance from the stack to the machine and along said defined path in overlapped relationship and at slow speed.

41. In a sheet feeding device for presenting sheets to a printing machine and the like, the combination of means for separating sheets from a stack, means for conveying said separated sheets along a defined path at high speed for part of the distance from the stack to the machine, slow moving means for carrying the sheets the remainder of the distance along said defined path to the machine, said slow moving means having a portion thereof disposed under the high speed conveying means, and means operable upon the high speed conveying means to cause the same to release the sheets and to drop the same onto the slow moving conveying means in overlapped relationship.

42. Sheet feeding means for printing machines and the like in which the point of sheet entrance is elevated from the floor, comprising a feeder unit having means to separate the sheets, a conveyer to present sheets individually to the machine at a speed slower than that of the machine, said conveyer being supported at an elevation determined by the height of the point of entrance of the sheets into the machine, and the feeder unit being supported close to the floor to facilitate loading thereof, and means to convey sheets singly from the feeder unit to the conveyer.

43. In a sheet feeding mechanism for presenting sheets to printing machines and the like, mechanism to present the sheets to the machine, and conveyer mechanism to carry sheets from a source of supply to said presenting mechanism, said conveyer mechanism comprising a plurality of sheet engaging means adapted to engage and carry individual sheets, and said sheet engaging means being spaced apart a distance less than the length of the sheets so that the sheets are carried to the sheet presenting mechanism and received thereby in overlapped relationship.

FRANK R. BELLUCHE.